United States Patent
Saminski et al.

(10) Patent No.: US 6,607,282 B2
(45) Date of Patent: Aug. 19, 2003

(54) MULTICOLORED BLINKING LIGHTING DEVICE

(76) Inventors: Moshe Saminski, Rechov Leon Blum 39/15, Haifa (IL), 33858; Eli Paz, Rechov Hatlamim 7, Pardes Chana (IL), 37000

(*) Notice: Subject to any disclaimer, the term of this patent is extended or adjusted under 35 U.S.C. 154(b) by 0 days.

(21) Appl. No.: 09/865,683

(22) Filed: May 29, 2001

(65) Prior Publication Data

US 2002/0181226 A1 Dec. 5, 2002

(51) Int. Cl.[7] ................................................. F21V 9/16
(52) U.S. Cl. ........................... 362/84; 362/205; 362/231
(58) Field of Search ............................ 362/84, 205, 231

(56) References Cited

U.S. PATENT DOCUMENTS

| | | | | |
|---|---|---|---|---|
| 2,376,330 A | * | 5/1945 | Dircksen et al. | 200/61.19 |
| 4,144,557 A | * | 3/1979 | Kerr, III et al. | 362/157 |
| 5,081,568 A | * | 1/1992 | Dong et al. | 340/321 |
| 5,469,342 A | * | 11/1995 | Chien | 224/660 |
| 5,607,226 A | * | 3/1997 | Toth et al. | 362/102 |
| 5,622,423 A | * | 4/1997 | Lee | 362/102 |
| 5,697,695 A | * | 12/1997 | Lin et al. | 340/321 |
| 5,865,524 A | * | 2/1999 | Campman | 362/102 |
| 6,070,987 A | * | 6/2000 | Jarvik | 362/102 |
| 6,075,322 A | * | 6/2000 | Pauly | 315/127 |
| 6,179,431 B1 | * | 1/2001 | Chien | 362/184 |
| 6,371,625 B2 | * | 4/2002 | Campman | 362/102 |

* cited by examiner

Primary Examiner—Alan Cariaso
Assistant Examiner—Ismael Negron
(74) Attorney, Agent, or Firm—Mark M. Friedman

(57) ABSTRACT

For illuminating or designating a darkened area, a device having at least two electroluminescent light sources that are independently set to be on, off or flashing. The color of the light emitted by each on of the at least two light sources is chosen do that the device can be used to project at least two different colors.

16 Claims, 1 Drawing Sheet

MULTICOLORED BLINKING LIGHTING DEVICE

FIELD AND BACKGROUND OF THE INVENTION

The present invention relates to pharology and, more particularly, to a device for illuminating or designating a darkened area or object with the aid of a multi-colored electroluminescent blinking light source which can be turned on and off at will.

The utility of illuminating darkened areas where it is difficult to illuminate by normal electrically powered means is well known. Some of the most common uses for self-powered light sources are military or recreational maneuvering, emergency marking for evacuation, light aircraft and helicopter marking and boundary markings for functions in addition to recreational uses. Portable flashlights are common, but their purpose is to focus light in a certain direction, whereas one of the major objectives of the present invention is to focus people's attention to a location or object (or steer people away) which can be seen from almost any direction.

A popular source of light has been chemiluminescent lightstick, which emits light as a result of a chemical reaction. U.S. Pat. No. 3,749,679 to Rahut, U.S. Pat. No. 4,751,616 to Smithey, U.S. Pat. No. 3,888,786 to Maudling and U.S. Pat. No. 3,816,326 to Bollyky describe in length chemiluminescent systems. U.S. Pat. No. 5,190,366 to World describes a multicolored chemiluminescent fishing lure. The disadvantage of the abovementioned prior art is that the reaction is not designed to stop and cannot be controlled once activated and cannot blink or flash.

There are generally two types of chemiluminescent systems. The two component chemiluminescent system, means generally a clear flexible tube containing one component, with a frangible ampule housed inside the tube and containing a second component that, when said frangible tube is fractured, mixes with the first component producing light. An aromatic ester of oxalic acid in a suitable solvent (the "oxalate component"), usually preferably includes the first component of a two component chemiluminescent system. A solution of a hydrogen peroxide compound, a hydroperoxide compound, or a peroxide compound in a suitable solvent (the "peroxide component"), usually preferably comprises the second component of a two component chemiluminescent system.

The second system utilizes "frozen" or "low-temperature storage" luminescent color tubes. It consists of premixing chemiluminescent components, filling tubing with the components, and immediately cooling and maintaining the tube at very low temperatures by the means of dry ice, low temperature freezers, or the like, to inhibit the chemical reaction until the tube is used.

The disadvantages of chemiluminescent systems are numerous. Amongst them are that some of the chemical components of the chemiluminescent systems are carcinogenic or at least unfriendly to the environment which could endanger users of these systems and the environment and that its state mode of use is, once the chemical reaction has started it is extremely difficult to stop it (unless freezing is used which is highly impractical for outdoor use), necessitating using a new light for every use. Additionally, if there were a need for various individual colors as is the case in many abovementioned uses, it would necessitate bringing many extra different colored lights into the field and they cannot blink or flash.

There is thus a widely recognized need for, and it would be highly advantageous to have, a battery operated, blinking, multi-colored electroluminescent light source devoid of the above limitations.

SUMMARY OF THE INVENTION

According to one aspect of the present invention there is provided a device for designating at least a portion of a darkened area. The device comprises an elongated body, at least two electroluminescent lighting elements extending along a major part of the elongated body, at least one battery capable of independently powering each of the at least two electroluminescent lighting elements, and a switch arrangement. The switch arrangement is capable of actuating at least two different combinations selected from the group consisting of all of the electroluminescent lighting elements off, at least one of the electroluminescent lighting elements off, at least one of the electroluminescent lighting elements on and all of the electroluminescent lighting elements on, wherein light emanating from the device is visible to an observer positioned at a distance from the device.

According to another aspect of the present invention there is provided a device for illuminating a darkened area. The device comprises an elongated body, at least two electroluminescent lighting elements extending along a major part of the elongated body, at least one battery capable of powering the at least two electroluminescent lighting elements and a switch arrangement. The switch arrangement is capable of actuating at least two different combinations selected from the group consisting of all of the electroluminescent lighting elements off, at least one of the electroluminescent lighting elements off, at least one of the electroluminescent lighting elements on and all of the electroluminescent lighting elements on, wherein light radiation emanating from the device allows an observer to perceive at least one feature of the darkened area.

According to further features in preferred embodiments of the invention described below, the device further includes an inverter capable of causing at least one of the electroluminescent lighting elements to switch from off to on with a defined periodicity.

According to still further features in preferred embodiments of the invention described below, the defined periodicity is adjustable.

According to still further features in preferred embodiments of the invention described below, the device is operated by a remote control mechanism.

According to still further features in the described preferred embodiments, a light originating from a lighting element of the at least two lighting elements is apparently colored when viewed at a distance from the device.

According to still further features in the described preferred embodiments, the elongated body is hollow to allow longitudinal deployment of the at least two electroluminescent lighting elements and includes a lateral end and a distal end.

According to still further features in the described preferred embodiments, the at least two electroluminescent lighting elements run parallel from the lateral end to the distal end of the elongated body.

According to still further features in the described preferred embodiments, the apparently colored lighting elements are colored with colors selected from the group consisting of red, green and yellow.

According to still further features in the described preferred embodiments, the device is used to designate at least one subject selected from a group consisting of an object, a destination, an aircraft and a boundary of an area.

According to still further features in the described preferred embodiments, a plurality of devices are operable by a single remote control mechanism.

The present invention successfully addresses the shortcomings of the presently known configurations by providing a device for designating at least a portion of a darkened area with at least two blinking, colored battery powered electroluminescent lighting elements.

BRIEF DESCRIPTION OF THE DRAWING

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawing.

DESCRIPTION OF THE PREFERRED EMBODIMENTS

Figure 1:
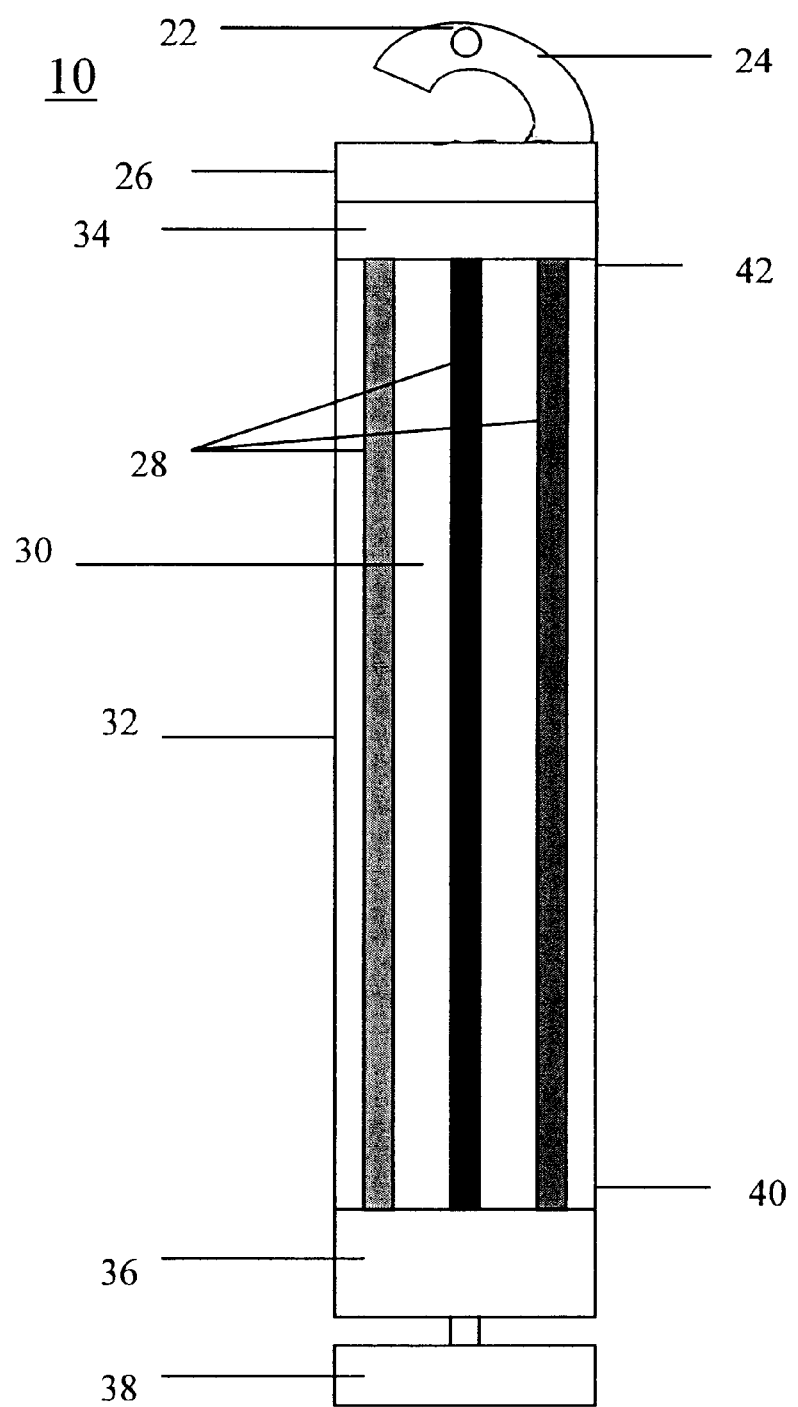
FIG. 1 is a schematic representation of a device for designating at least a portion of a darkened area.

The present invention is of a device in the field of pharology. Specifically, the present invention can be used for designating at least a portion of a darkened area with at least two battery powered colored, blinking, electroluminescent lighting elements.

The principles and operation of a device for designating at least a portion of a darkened area according to the present invention may be better understood with reference to the drawing and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates the device 10 for designating at least a portion of a darkened area. Device 10 includes an elongated body 32. In a preferred embodiment the total length of device 10 is 160 millimeters long and device 10 has a width of 18 millimeters. Device 10 further includes at least two electroluminescent lighting elements 28 extending along a major part of elongated body 32.

FIG. 1 illustrates three electroluminescent lighting elements 28 powered by at least one battery 26 capable of independently powering each of at least two electroluminescent lighting elements 28. Preferred colors are red, green and yellow. Electricity is converted from DC to AC in the electric current inverter 34. Inverter 34 is also capable of causing at least one of the electroluminescent lighting elements to switch from off to on with a defined periodicity. The defined periodicity is adjustable. The defined periodicity can be adjusted either by the user or by the manufacturer. Light originating from a lighting element 28 of said at least two lighting elements 28 is apparently colored when viewed at a distance from device 10. This can be achieved, for example, by the use of electroluminescent lighting elements 28 Lytec™, manufactured by Elam Inc. Har Hotzvim, Jerusalem, Israel. Elam's electroluminescent lighting elements 28 includes a central electrode surrounded by an electrically insulated dielectric layer, a layer consisting of a mixture of an electroluminophor powder and a binder with the mixture layer being disposed on the dielectric layer. Alternately, or additionally other types of electroluminescent lighting elements 28 may be placed in proximity to a colored filter so that light passing there through appears colored when viewed from a distance.

Device 10 further includes a switching mechanism 36 controlled by mode-selector knob 38. Mode-selector knob 38 is used to select one of at least two different combinations selected from the group consisting of: a) all electroluminescent lighting elements 28 OFF; b) at least one of electroluminescent lighting elements 28 OFF; c) at least one of electroluminescent lighting elements 28 ON; and d) all of electroluminescent lighting elements 28 ON. Light emanating from device 10 is visible to an observer positioned at a distance from device 10.

Elongated body 32 is preferably transparent, and has a hollow interior 30, which allows for longitudinal deployment of at least two electroluminescent lighting elements 28 which run parallel from the lateral end 40 to the distal end 42 of elongated body 32.

In practice, device 10 can be used for designating an object in the dark. A color is chosen by a person wanting to indicate to others a particular property concerning the object in the darkened area. An indication could be that the people seeking the object have arrived at their destination by selecting a green color, or a warning to stay away from an object or a cliff for example could be demonstrated by using a red color. In a preferred embodiment the light emanating from device 10 appears to blink or flashing gleams of light.

A further use of device 10 could be in the marking of an aircraft or vehicles or for marking a boundary of an area. After indication or warning has been achieved, device 10 is turned off using mode selector knob 38 and is retrieved and stored for future use.

In an additional preferred embodiment device 10 is equipped with a remote control sensor (not shown), which is controlled from a remote location. Additionally or alternately, a plurality of devices 10 can be simultaneously controlled from a single remote such as in a runway. Remote control systems are common and are known to those skilled in the art of remote control sensory.

What is claimed is:

1. A device for designating at least a portion of a darkened area, the device comprising:
    (a) an elongated body;
    (b) at least two electroluminescent lighting elements extending along a major part of said elongated body;
    (c) at least one battery capable of independently powering each of said at least two electroluminescent lighting elements; and
    (d) a switch arrangement, said switch arrangement capable of actuating at least two different combinations selected from the group consisting of:

(i) all of said electroluminescent lighting elements off;
(ii) at least one of said electroluminescent lighting elements off;
(iii) at least one of said electroluminescent lighting elements on;
(iv) all of said electroluminescent lighting elements on
wherein at least two of said at least two electroluminescent lighting elements project substantially different colored light, and wherein light emanating from the device is visible to an observer positioned at a distance from the device and wherein said elongated body is substantially transparent and wherein said at least two electroluminescent lighting elements are contained within said elongated body.

2. The device of claim 1, wherein said device is operated by a remote control mechanism.

3. The device of claim 1, wherein said elongated body is hollow to allow longitudinal deployment of said at least two electroluminescent lighting elements and includes a lateral end and a distal end.

4. The device of claim 1, wherein said at least two electroluminescent lighting elements run parallel from said lateral end to said distal end of said elongated body.

5. The device of claim 1, wherein the device is used to designate at least one item selected from a group consisting of an object, a destination, an aircraft and a boundary of an area.

6. A plurality of devices according to claim 1, wherein each device of said plurality is operable by a single remote control mechanism.

7. The device of claim 1, further including an inverter capable of causing at least one of said electroluminescent lighting elements to switch from off to on with a defined periodicity.

8. The device of claim 7, wherein said defined periodicity is adjustable.

9. The device of claim 1, wherein a light originating from a lighting element of said at least two lighting elements is apparently colored when viewed at a distance from said device.

10. The device of claim 9, wherein said apparently colored lighting elements are colored with colors selected from the group consisting of red, green and yellow.

11. A device for illuminating a darkened area, the device comprising:
(a) an elongated body;
(b) at least two electroluminescent lighting elements extending along a major part of said elongated body;
(c) at least one battery capable of powering said at least two electroluminescent lighting elements and
(d) a switch arrangement, said switch arrangement capable of actuating at least two different combinations selected from the group consisting of:
(i) all of said electroluminescent lighting elements off;
(ii) at least one of said electroluminescent lighting elements off;
(iii) at least one of said electroluminescent lighting elements on;
(iv) all of said electroluminescent lighting elements on
wherein at least two of said at least two electroluminescent lighting elements project substantially different colored light, and wherein light radiation emanating from the device allows an observer to perceive at least one feature of the darkened area and wherein said elongated body is substantially transparent and wherein said at least two electroluminescent lighting elements are contained within said elongated body.

12. The device of claim 11, wherein said device is operated by a remote control mechanism.

13. The device of claim 11, wherein a light originating from a lighting element of said at least two lighting elements is apparently colored when viewed at a distance from said device.

14. A plurality of devices according to claim 11, wherein each device of said plurality is operable by a single remote control mechanism.

15. The device of claim 11, further including an inverter capable of causing at least one of said electroluminescent lighting elements to switch from off to on with a defined periodicity.

16. The device of claim 15, wherein said defined periodicity is adjustable.

\* \* \* \* \*